United States Patent [19]

Payne et al.

[11] 4,265,597
[45] May 5, 1981

[54] BLOWER SYSTEMS CIRCUIT INTERRUPTING APPARATUS AND METHOD

[75] Inventors: Harris F. Payne, Arlington; Michael G. Evans, Houston, both of Tex.

[73] Assignee: A.R.A. Manufacturing Co., Grand Prairie, Tex.

[21] Appl. No.: 933,639

[22] Filed: Aug. 11, 1978

[51] Int. Cl.³ .......................... F04B 49/06; F25B 1/04
[52] U.S. Cl. ........................................ 417/32; 62/230; 417/53
[58] Field of Search ............... 417/32, 53, 45; 318/334; 361/24; 62/230

[56] References Cited

U.S. PATENT DOCUMENTS

| 2,424,344 | 7/1947 | Veinott | 318/334 |
| 2,768,342 | 10/1956 | Vaughan et al. | 361/24 |
| 2,811,019 | 10/1957 | Courtney | 417/32 |
| 2,946,203 | 7/1960 | Carver | 62/230 |
| 3,080,103 | 3/1963 | McAllister | 417/44 |
| 3,141,996 | 7/1964 | McGrath | 361/24 |
| 3,278,111 | 10/1966 | Parker | 417/32 |
| 3,479,837 | 11/1969 | Minor | 62/230 |
| 3,544,236 | 3/1969 | Brookmire | 417/32 |
| 3,759,634 | 9/1973 | Eskola | 417/32 |
| 3,839,692 | 10/1974 | Plasko | 361/24 |
| 3,874,187 | 4/1975 | Anderson | 417/32 |
| 4,007,605 | 2/1977 | Denny | 318/334 |

Primary Examiner—William L. Freeh
Attorney, Agent, or Firm—Cox & Smith Incorporated

[57] ABSTRACT

A circuit interrupting apparatus and method for a blower having a resistance heater in the air stream of the blower for cooling of the resistance heater and a fuse surrounded by the resistance heater to cause the fuse to blow through heat of the resistance heater when the air stream stops flowing and the amperage of the circuit is not sufficient to blow the main fuse of the system.

9 Claims, 5 Drawing Figures

BLOWER SYSTEMS CIRCUIT INTERRUPTING APPARATUS AND METHOD

BACKGROUND OF THE INVENTION

This invention relates generally to a blower motor control circuit and in particular to a device for protecting the circuit from overloads at the lower speeds of a blower motor.

It has been a practice in the past to control the speed of a motor vehicle air conditioning and heater blower motor through the use of one and more voltage-dropping resistors. Such resistors may be used singularly or in combination to provide varying speeds for a single speed series connected wire-wound or permanent magnet motor. So far as known, it has also been a practice to position such resistors in the air stream of a blower motor to dissipate the heat generated by flow of current through the resistors at the lower motor speeds. It has also been a practice to provide a main fuse for the blower motor control circuit which fuse has sufficient amperage to handle the current going through the blower motor at its high speed.

Malfunctions may occur in the blower system which can cause fire hazards. Such malfunctions may typically be a loss of lubricant in the blower motor bearing causing the motor to lock up. Another malfunction may be improper insulation causing a short in the blower motor circuit. If the motor locks up or a short occurs in the high speed position, there is sufficient amperage in the circuit generally to blow the main fuse to interrupt the circuit. However, if the blower speed control switch is in the medium or lower positions in the case of three speed motors the circuit current may be insufficient to quickly blow the main fuse. If a malfunction occurs in the blower motor system at the lower speeds, and the circuit is not quickly interrupted, a fire hazard may result.

It has been known for many years that a fuse may be electrically heated to increase its sensitivity so that it will blow under over-voltage conditions. Known U.S. patents related to circuit protecting devices are as follows: U.S. Pat. Nos. 1,214,728; 1,279,020; 1,966,466; 2,763,752; 3,735,312; and 3,839,692.

So far as known, the problem has existed for some time in the motor vehicle field relating to the protection of air conditioning and blower motor circuits. Despite the awareness in the industry of the problem, so far as known, no one has come up with a satisfactory marketable solution to the problem. Though it has been known for over fifty years that a fuse may be heated to increase its sensitivity, no one has applied this knowledge to solve the problem of protecting a blower motor circuit. It is the object of this invention to provide a circuit interruptor which will quickly interrupt the circuit of a malfunctioning blower motor system when the blower motor is at lower speeds which may lack sufficient current amperage in the circuit to quickly blow the main fuse. It is the object of this invention to provide a device which is inexpensive and simple to manufacture and which may be readily incorporated in existing air conditioning and heating systems of motor vehicles.

SUMMARY OF THE INVENTION

The invention provides a new and improved blower motor control circuit which protects the motor and system from circuit overloads when the motor is operated at less than its normal speed. One or more resistor heaters are placed in a control circuit to lower the rotational speed of a single speed series connected wire-wound or permanent magnet motor with the resistant heaters positioned in the air stream of the blower for cooling thereof. The resistance heaters may include a coil wire surrounding a fuse so that heating of a resistance heater will facilitate blowing of the fuse. The blower may typically be a single speed motor which uses a plurality of resistance heaters to provide lower speeds for the motor. The one or more fuses used in connection with the resistance heaters have a lower amperage capacity than the main fuse for the circuit so that these fuses will blow at the lower amperage levels in the circuit at medium and low speeds when the blower motor is locked. The positioning of the fuses within the coiled resistant heater wires prevents drooping of the wires when heated to prevent the wires from coming in contact with flamable materials.

BRIEF DESCRIPTION OF THE PREFERRED EMBODIMENT

Figure 2:
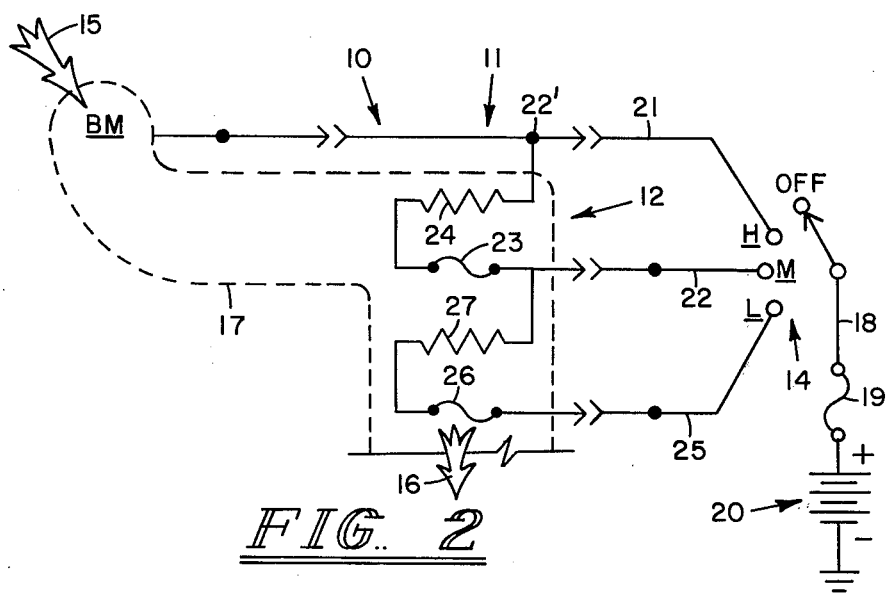
FIG. 2 is a side view of the fuse resistor assembly showing the pin connectors and resistance heater and fuses.
Figure 1:
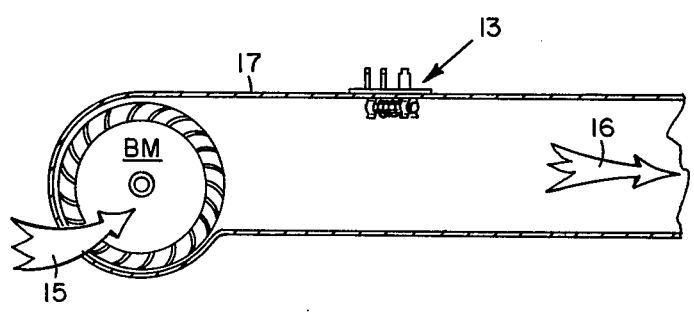
FIG. 1 is a view of the base of the fuse resistor assembly showing the pin connectors for wires.

Referring to FIGS. 1 and 2 of the drawing, there is shown a blower system 10. The blower system 10 includes a control circuit 11 which is used to operate a blower motor BM. A circuit interruptor means 12 is provided which utilizes a fuse-resistor assembly 13. A three-way switch 14 provides high, medium and low speeds for the blower motor BM. Switch 14 includes an off position and high, medium and low speed positions which are designated H, M and L respectively. The blower BM directs the stream of air represented by the arrows 15 and 16 through a conduit 17. In the case of a motor vehicle, the air through the conduit is passed over heating or air-conditioning coils to affect the temperature and/or humidity of the air. Fuse-resistor assembly 13 may typically be mounted in the evaporator just up from the blower motor so that air from the blower motor cools the resistor wires on the fuse-resistor assembly as explained more fully hereinafter. A power supply line 18 has a conventional main fuse 19 and battery 20 or other power source which supplies power to operate the blower motor BM.

When the three-way switch 14 is in the high position, line 21 carries a direct flow of current to the common point 22' so as to provide the blower motor BM with the maximum current. The blower motor BM may typically be a single speed, series-connected wire-wound or permanent magnet motor. When the blower motor is operated at the high speed of the three-way switch, the main fuse 19 provides for circuit interrupting in the case of overload of the blower motor BM or the control circuit 11. Sufficient amperage is provided in the circuit to blow the main fuse 19 which may have an amperage capacity in the order of 30 amps.

When the three-way switch 14 is in the medium position a second line 22 is provided to channel the current through a portion of the circuit interrupting means 12. In the case of the medium position of the switch, the current travels through a fuse 23 and resistor 24 to the common point 22' and then to the blower motor BM. The resistor 24 reduces the amperage flow to the motor BM and accordingly results in a lower speed than when in a high position.

When the three-way switch is in the low position L, a third line 25 directs the current through a second fuse 26 and a second resistor 27 in the circuit interrupting means 12. The current must also travel through the fuse 23 and resistor 24 until it reaches a common point 22' where it is directed to run the blower motor BM. The combination of the resistors 27 and 24 further reduce the amperage below that of the medium speed to run the blower motor BM at its low speed.

The passage of current through the resistors 24 and 7 results in a heat generation in the resistors. Accordingly, the resistors 27 and 24 are positioned in the stream of air from the blower motor BM as represented by the arrows 15 and 16 to dissipate the heat generated in the resistors. Since a mass of air which flows over the resistors is large in comparison to the heat generated, the resistor temperature is maintained at or very near the temperature of the air flowing over the rsistors. As discussed above, it has heretofore been known that speed-dropping resistors such as resistors 27 and 24 could be positioned in a motor vehicle conduit such as 17 dissipate the heat generated by the resistors which drop the speed of the blower motor.

Figure 3:
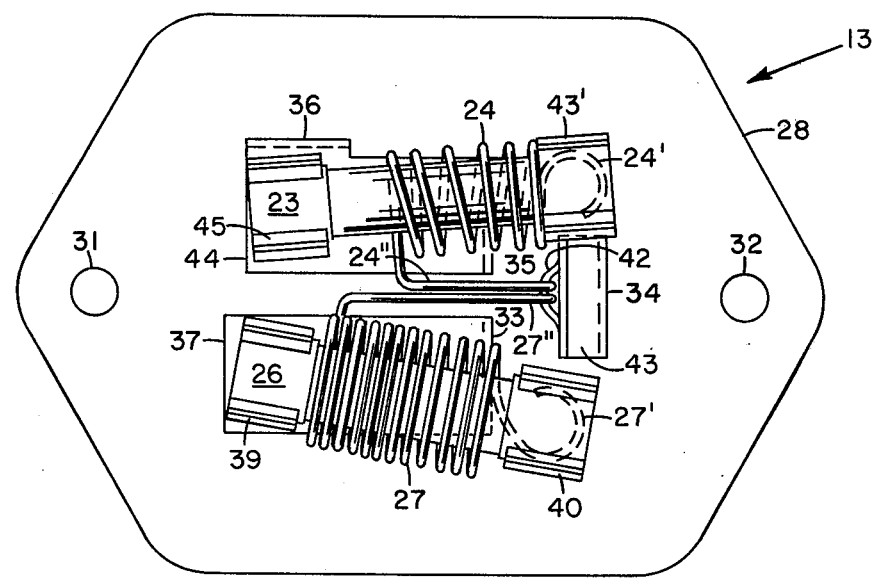
FIG. 3 is a side view of the fuse resistor assembly showing the resistor wire and fuses.
Figure 4:
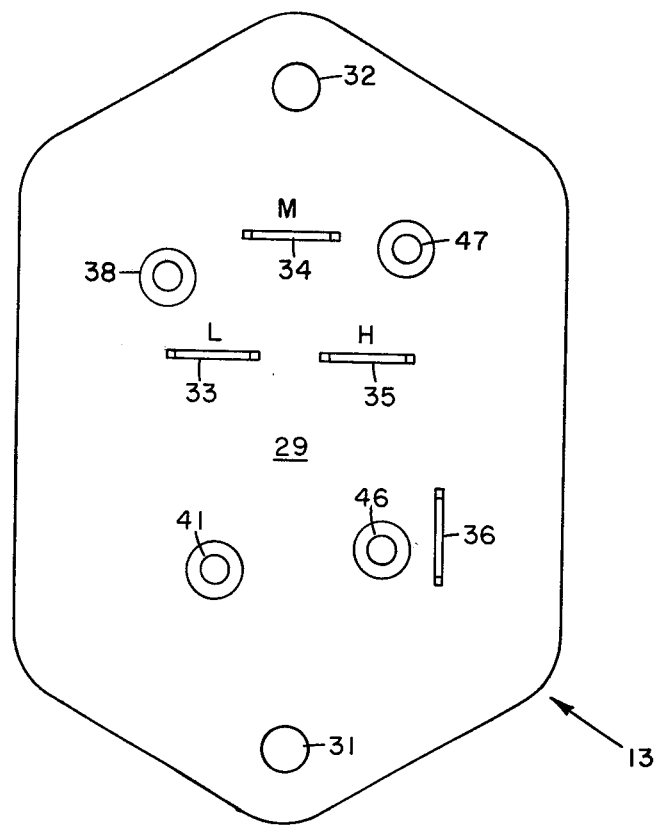
FIG. 4 is schematic drawing showing the control circuit of the blower system.
Figure 5:
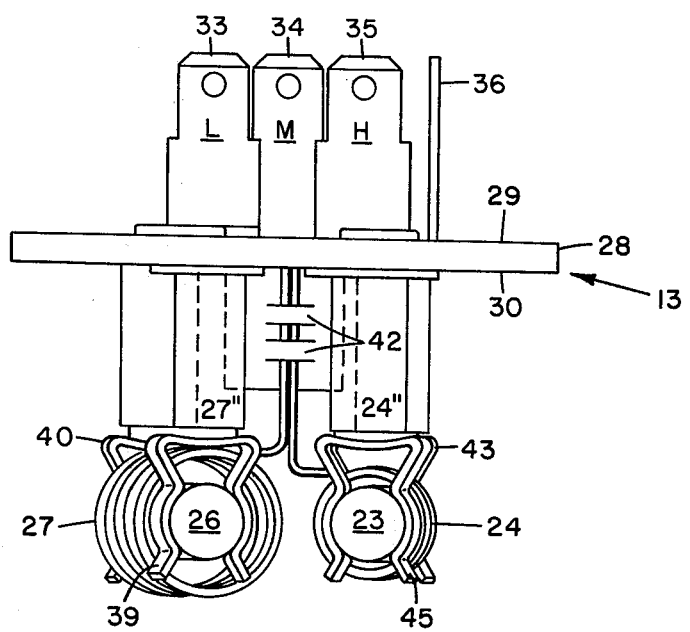
FIG. 5 is a schematic view showing the fuse resistor assembly position in a conduit with arrows indicating air flow from the blower motor.

Referring to FIGS. 3, 4 and 5 of the drawing, there is shown a specific embodiment of a fuse resistor assembly which may be used in the invention. A fuse resistor assembly 13 includes a base member 28 which has an outer side 29 and an inner side 30. The base member includes a plurality of aperatures 31 and 32 for securing the base member to the conduit 17 as best shown in FIG. 1. Any suitable fasteners could be used for extending through the apertures 31 and 32 for securing it to the conduit.

It is best shown in FIGS. 4 and 5 suitable electrical connector spades 33, 34, 35 and 36 are provided for connecting to wires from the three-way switch 14 and blower motor BM. The spades 33–36 are conventional in construction and are designed for securing with mating connectors which may be connected to the wires from the blower motor and three-way switch. As shown in FIG. 5, the spades extend through the base member from the inner side 30 and through the outer side 29. Line 25 is connected to the spade 33 which is the low speed circuit, line 22 is connected to spade 34 which is the medium speed circuit and line 21 is connected to spade 35 which is the high speed circuit. Spade 36 is a common point with the other three spades 33–35.

As best shown in FIG. 3, the spade 33 is connected to a member 37 which is in turn connected to the base member 28 through a rivet 38. The member 37 in turn includes an outwardly extending bracket 39 which holds the end of the fuse 26. Another bracket 40 is provided for supporting the other end of the fuse 26. The bracket 40 is secured to the base member 28 through a rivet 41. As is best shown in FIGS. 3 and 5, the resistor wire 27 is wound around the fuse 26 and is in contact with the bracket 40 through a curved end portion 27'. Accordingly current entering through the spade 33 will travel through fuse 26 through the bracket 29 and through the bracket 40 through resistor 27. Spade 34 is connected to member 42 which is connected to the base member which member includes a wire connecting portion 43. One end 27" extends through the member 42 as best shown in FIG. 5. An end 24" of the resistor wire 24 also extends through the member 43. Accordingly this forms an electrical connection whereby current flowing through the resistor wire 27 will flow through the leg portion 24" and through the resistor wire 24.

Bracket member 43' is provided for supporting one end of the fuse 23. An end 24' of the resistor wire 24 is connected with the bracket member 43' so that current flowing through the resistor wire 24 will also flow through the bracket member 43' and in turn to the fuse 23.

The spade 36 is secured to a member 34 which includes a bracket 45 for supporting the other end of the fuse 23. As shown in FIGS. 3 and 5, the resistor 24 is wound around the fuse 23. The member 44 is secured to the base member 28 through a rivet 46 and the bracket 43 is secured to the base member near rivet 47. The flow of current for the fuse resistor assembly when the three-way switch is in the medium position is through the spade 34 and through the resistor wire 24' to the bracket 43 and then through the fuse 26 and bracket 45 to the spade 36. As best shown in FIG. 3, the spade 35 is also secured to the member 44 so that the flow of current, when the switch is in the high speed, is through spade 35, member 44 and spade 36.

The amperage capacity of the fuses 23 and 26 would be determined depending on the total motor current for the blower motor BM at its high speed. By way of example, the low speed resistor wire 27 might have a resistance of 1.8 ohms and the medium speed resistor wire 24 might have a resistance of 0.5 ohms. Given the motor impedance and the typical motor current and the resistance of the resistance wires it would be possible to determine the motor current at the various speeds. The motor current could then be translated to the heat to be dissipated in each resistor determined by the current and the resistance of the resistor. The amperage capacity of the fuses 23 and 26 could then be determined in order to allow blowing of the fuses without damage to the circuit. The value of the fuses 23 and 26 would also be sized to allow blowing of the fuses if shorts occured at various points in the circuit. If the resistor wires 24 and 27 do not get hot enough to blow the fuses, the resistor is probably too cool to cause a fire so no problem generally exists. By having the fuse located in the center of the resistor wire, the resistor wire is prevented from drooping where it might contact flamable members for the conduit or housing which also might cause a fire hazard. In the case that one of the fuses is blown, the base member 28 may be removed from the conduit 17 and the blown fuse may then be replaced and suitable repairs may be made in the circuit or blower motor to prevent further overloads of the circuit. The fuses 23 and 26 provide a safety factor which normally does not exist with a single main fuse such as fuse 19. The fuses 23 and 26 will blow at much lower amperages than that of the main fuse 19 which lower amperages or current levels are present when the motor is in the low speed and medium speed. The resistor wires increases the sensitivity of the fuses 23 and 26 while at the same time the resistor wires are cooled by the flow of air to prevent blowing of the fuses 23 and 26 during normal operation. However, in the event of some malfunction the resistor wires 24 or 27 will be quickly heated due to the resistance of the resistor wires which will facilitate blowing of the appropriate fuse depending on which position the three-way switch 14 is in. This system is particularly helpful to protect the control circuit when the blower motor stops during operation for whatever reason.

The invention is particularly applicable where the movement of air is important to the operation of the system. The resistors used to control the motor speed may damage surrounding structure when the flow of air is stopped and current is still flowing through the resistors. It is important for the system to be shut down when either the system is overloaded or the air flow is stopped. The invention provides an apparatus and method for interrupting an electrical system when a short circuit occurs, blower motor stoppage occurs due to lock up for whatever reason, interruption of the air flow occurs and when a gross overload of the electric circuit occurs.

The starting load for the blower motor in the system is higher than the operating load so that normal fuse protection against slight overload conditions could cause fuse failure on start-up. The fuses can be oversized to prevent fuse failure during short time overload while still providing quick protection in the event of air flow interruption. The resistance heaters cause the oversized fuses to blow before their rated current capacity is reached to prevent unneccessary damage to the system.

While there has been shown and described a preferred embodiment of a blower systems circuit interrupting apparatus and method in accordance with the invention, it will be appreciated that many changes and modifications may be made therein without, however, departing from the essential spirit of the invention within the scope of the claims.

We claim:

1. A blower motor control for a vehicular air conditioning and heating system comprising:
   a circuit interrupting means positioned in the blower air stream;
   said circuit interrupting means, having circuit heating means responsive to current flowing in the circuit for causing the circuit interrupting means to interrupt when the stream of air stops or does not sufficiently cool the heating means and the heating means over-heats from an overload in the circuit, to protect the circuit from overloading and to prevent fires;
   the heating means includes a resistance heater which is a blower motor speed-dropping resistor; and
   the circuit interrupting means includes a fuse which is heated by the heating means to cause the fuse to interrupt the circuit at a current flow less than the rated current carrying capability of the fuse.

2. The system as set forth in claim 1, wherein: the resistance heater surrounds the circuit-interrupting means.

3. The system as set forth in claim 1 wherein: the resistance heater is adjacent to the circuit interrupting means.

4. A blower motor control for a vehicular air conditioning and heating system comprising:
   a circuit interrupting means positioned in the blower air stream;
   said circuit interrupting means, having circuit heating means responsive to current flowing in the circuit for causing the circuit interrupting means to interrupt when the stream of air stops or does not sufficiently cool the heating means and the heating means over-heats from an overload in the circuit, to protect the circuit from overloading and to prevent fires;
   the heating means includes a resistance heater which is a blower motor speed-dropping resistor;
   the circuit interrupting means includes a fuse which is heated by the heating means to blow the fuse thereby interrupting current flow through the heating means and to the blower motor; and
   the fuse is heated by the heating means to cause the fuse to interrupt the circuit at a current flow less than the rated current carrying capability of the fuse.

5. The system as set forth in claim 4 wherein: the resistance heater is adjacent to the fuse.

6. The system as set forth in claim 4 wherein: the resistance heater surrounds the fuse.

7. A method for protecting the control circuit for a blower motor of a vehicular air conditioning and heating system comprising the steps of:
   passing current through at least one resistor heater and a fuse adjacent the resistor heater to drive a blower motor;
   flowing a stream of air over at least one resistor heater with the blower motor to cool the resistor heater to prevent the resistor heater from heating the fuse during normal operating conditions of the blower motor and to allow protection of the circuit under abnormal conditions;
   controlling the speed of the blower motor with the resistor heater; and
   the step of passing current includes passing a current through said fuse having an amperage less than is required to blow a main fuse in the control circuit but sufficient to blow said fuse when the resistor heater heats the fuse to a sufficient temperature.

8. A blower motor control for a vehicular air conditioning and heating system comprising:
   a circuit interrupting means positioned in the blower air stream;
   said circuit interrupting means, having circuit heating means responsive to current flowing in the circuit for causing the circuit interrupting means to interrupt when the stream of air stops or does not sufficiently cool the heating means and the heating means over-heats from an overload in the circuit, to protect the circuit from overloading and to prevent fires;
   the heating means includes a resistance heater which is a blower motor speed-dropping resistor;
   the circuit interrupting means includes a plurality of fuses; and
   the heating means includes a plurality of resistance heaters with a resistance heater for each of the plurality of fuses.

9. A blower motor control for a vehicular air conditioning and heating system comprising:
   a circuit interrupting means positioned in the blower air stream;
   said circuit interrupting means, having circuit heating means responsive to current flowing in the circuit for causing the circuit interrupting means to interrupt when the stream of air stops or does not sufficiently cool the heating means and the heating means over-heats from an overload in the circuit, to protect the circuit from overloading and to prevent fires;

the heating means includes a resistance heater which is a blower motor speed-dropping resistor;

the circuit interrupting means includes a fuse which is heated by the heating means to blow the fuse thereby interrupting current flow through the heating means and to the blower motor; and the fuse has an amperage capacity lower than a main fuse in blower system circuit, but said amperage capacity is high enough to prevent circuit interruption under normal operating conditions.

* * * * *